US010853427B2

(12) United States Patent
Gat et al.

(10) Patent No.: US 10,853,427 B2
(45) Date of Patent: Dec. 1, 2020

(54) FILTERING OF LARGE SETS OF DATA

(71) Applicant: Microsoft Technology Licensing, LLC, Redmond, WA (US)

(72) Inventors: Eran Gat, Herzelia (IL); Moshe Goldstine, Herzelia (IL); Elad Yom-Tov, Herzelia (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 592 days.

(21) Appl. No.: 15/640,082

(22) Filed: Jun. 30, 2017

(65) Prior Publication Data

US 2018/0329997 A1 Nov. 15, 2018

(30) Foreign Application Priority Data

May 15, 2017 (GB) .................................. 1707766.0

(51) Int. Cl.
*G06F 17/30* (2006.01)
*G06F 16/9535* (2019.01)
*G06F 16/335* (2019.01)
*G06F 16/33* (2019.01)

(52) U.S. Cl.
CPC ........ *G06F 16/9535* (2019.01); *G06F 16/335* (2019.01); *G06F 16/3347* (2019.01)

(58) Field of Classification Search
CPC . G06F 16/9535; G06F 16/3347; G06F 16/335
See application file for complete search history.

(56) References Cited

U.S. PATENT DOCUMENTS

| 9,311,669 | B2 | 4/2016 | Rashwan |
| 2012/0316996 | A1 | 12/2012 | Shin et al. |
| 2014/0074665 | A1 | 3/2014 | Stewart |
| 2016/0063586 | A1 | 3/2016 | Speier |
| 2016/0335688 | A1 | 11/2016 | Wang et al. |
| 2017/0091171 | A1* | 3/2017 | Perez ...................... G10L 15/22 |
| 2018/0174160 | A1* | 6/2018 | Gupta ................ G06Q 30/0201 |

(Continued)

FOREIGN PATENT DOCUMENTS

| WO | 2003038560 A2 | 5/2003 |
| WO | 2005057363 A2 | 6/2005 |

OTHER PUBLICATIONS

Movahhed, Mandy, "How Access to Customer Order History Helps you Sell More", https://www.handshake.com/blog/wholesale-sales-software-customer-history/, Published on: Sep. 18, 2014, 7 pages.

(Continued)

*Primary Examiner* — Huawen A Peng

(57) ABSTRACT

A computer-implemented filtering method comprising: receiving a set of propositions, each comprising a respective linguistic description expressed by a respective user; forming an input matrix of lexical components vs. propositions, wherein rows in the input matrix represent the propositions and columns in the input matrix represent lexical components in the respective descriptions; performing a matrix factorization on the input matrix to reveal latent clusters of the lexical components and/or propositions; filtering the set of propositions based on one or more of the latent clusters; and outputting a result of the filtering to a target user.

20 Claims, 5 Drawing Sheets

(56) References Cited

U.S. PATENT DOCUMENTS

2018/0225368 A1* 8/2018 Grond ................. G06K 9/6218

OTHER PUBLICATIONS

"Seller Forums", https://sellercentral.amazon.com/forums/thread.jspa?threadID=202912, Retrieved on: Mar. 15, 2017, 3 pages.
"Arg max", Retrieved from: https://en.wikipedia.org/wiki/Arg_max, Retrieved Date: Apr. 8, 2020, 03 Pages.

* cited by examiner

Figure 2

| | Tent | Lightweight | Blue | Outdoors | Backpack | Green | Waterproof | All-weather | Sleeping bag | Camping | |
|---|---|---|---|---|---|---|---|---|---|---|---|
| | 1 | 1 | 1 | 1 | 0 | 0 | 0 | 1 | 0 | 1 | ... |
| | 0 | 1 | 0 | 1 | 1 | 1 | 1 | 0 | 0 | 0 | ... |
| | 0 | 1 | 0 | 1 | 0 | 0 | 1 | 1 | 1 | 1 | ... |
| | ⋮ | ⋮ | ⋮ | ⋮ | ⋮ | ⋮ | ⋮ | ⋮ | ⋮ | ⋮ | ⋱ |

C

Lexical components in user description of proposition
$j = 0 \ldots J$

Propositions (offers/needs)
$i = 0 \ldots I$

FILTERING OF LARGE SETS OF DATA

CROSS-REFERENCE TO RELATED APPLICATIONS

This application claims priority to GB application serial number 1707766.0, filed May 15, 2017, the entirety of which is hereby incorporated by reference herein.

BACKGROUND

Modern computer systems support networking via wide-area, packet-switched networks or internetworks such as the Internet. These enable the networking together of many end-user terminals and also servers hosting various online services. For instance, a server providing a given service may be distributed over multiple server units at multiple sites (so-called "cloud" storage or cloud computing).

Such networks and services make available huge quantities of data resources to users. However, the proliferation of such data can become self-defeating, in that the sheer volume of available data can begin to obfuscate the data that is most relevant to any particular target. I.e. as the amount of available data increases, it becomes more and more difficult for users to find and connect to the most relevant resources.

Thus whilst the proliferation in the amount of available information is generally considered a positive development for humankind, the volume of data also has the potential to compromise the utility of the system. To address this a suitable filtering technique is required, enabling a user to find and connect with the most relevant resources from amongst the vast pool of available data.

One known filtering technique is referred to as "collaborative filtering." Collaborative filtering begins by forming a matrix of user IDs vs. items IDs. The rows of the input matrix represent different users and the columns represent different types of items (e.g. types of product), with all items of a given type (i.e. class) categorized under the same item ID. The filtering then comprises performing a matrix factorization on this input matrix. Matrix factorization is a known mathematical algorithm which, for an input matrix C, determines two smaller matrices A and B such that A·B (the matrix product of A and B) approximately equals C. One of these matrices A represents users vs. "latent factors", wherein the latent factors in this matrix represent clusters of user IDs that tended to be associated with the same items (e.g. users who viewed or bought many of the same items). The other factored-out matrix B represents latent factors vs. items. In this second matrix the latent factors represent clusters of item IDs that tended to be associated with the same users (e.g. items viewed or bought by many of the same users). Thus the matrix factorization can be used to reveal latent clusters of related users and/or related items.

SUMMARY

Standard collaborative filtering thus relies on some form of standard representation for types of products, e.g. an ID for each model or category of product. For example, an online store will have a catalogue number for each item, which means that the filtering algorithm can determine that two people bought the same product if they bought products with the same catalogue number.

However, not all services take the form of systematically-curated online stores with a scheme of product IDs or the like, i.e. classifying all instances of a given type of item under the same item ID. For instance, various "shared economy" services are now available, wherein users can post available resources or requirements for resources identified only by user-composed descriptions of the resources in question. In contrast with the conventional collaborative filtering model described above, within a shared economy model there is no notion of catalogue number or product ID. A user may describe an item in one way, and the next person may use quite different wording for describing the same kind of item. It would therefore be desirable to provide a more versatile mechanism for filtering data to find the most relevant resources, and thereby in turn improve interconnectivity in a mass data and resource sharing system.

According to one aspect disclosed herein, there is provided a computer-implemented filtering method comprising: (a) receiving a set of propositions, each comprising a respective linguistic description expressed by a respective user; (b) forming an input matrix of lexical components vs. propositions, wherein rows in the input matrix represent the propositions and columns in the input matrix represent lexical components in the respective descriptions; (c) performing a matrix factorization on the input matrix to reveal latent clusters of the lexical components and/or propositions; (d) filtering the set of propositions based on one or more of said latent clusters; and (e) outputting a result of the filtering to a target user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made, by way of example only, to the accompanying drawings in which:

FIG. 2 schematically illustrates an example of an input matrix having rows representing different propositions (offers or needs) and columns representing different lexical components in a user-composed description of each proposition, FIG. 3 schematically illustrates a factorization of a matrix of propositions by lexical components, FIG. 4 schematically illustrates a step of multiplying a matrix by a vector as used in certain embodiments disclosed herein, FIG. 5 schematically illustrates another step of multiplying a matrix by a vector as used in embodiments disclosed herein, FIG. 6 schematically illustrates a matrix of users by propositions, and FIG. 7 schematically illustrates yet another step of multiplying a matrix by a vector according to certain embodiments disclosed herein.

DETAILED DESCRIPTION OF EMBODIMENTS

Figure 1:
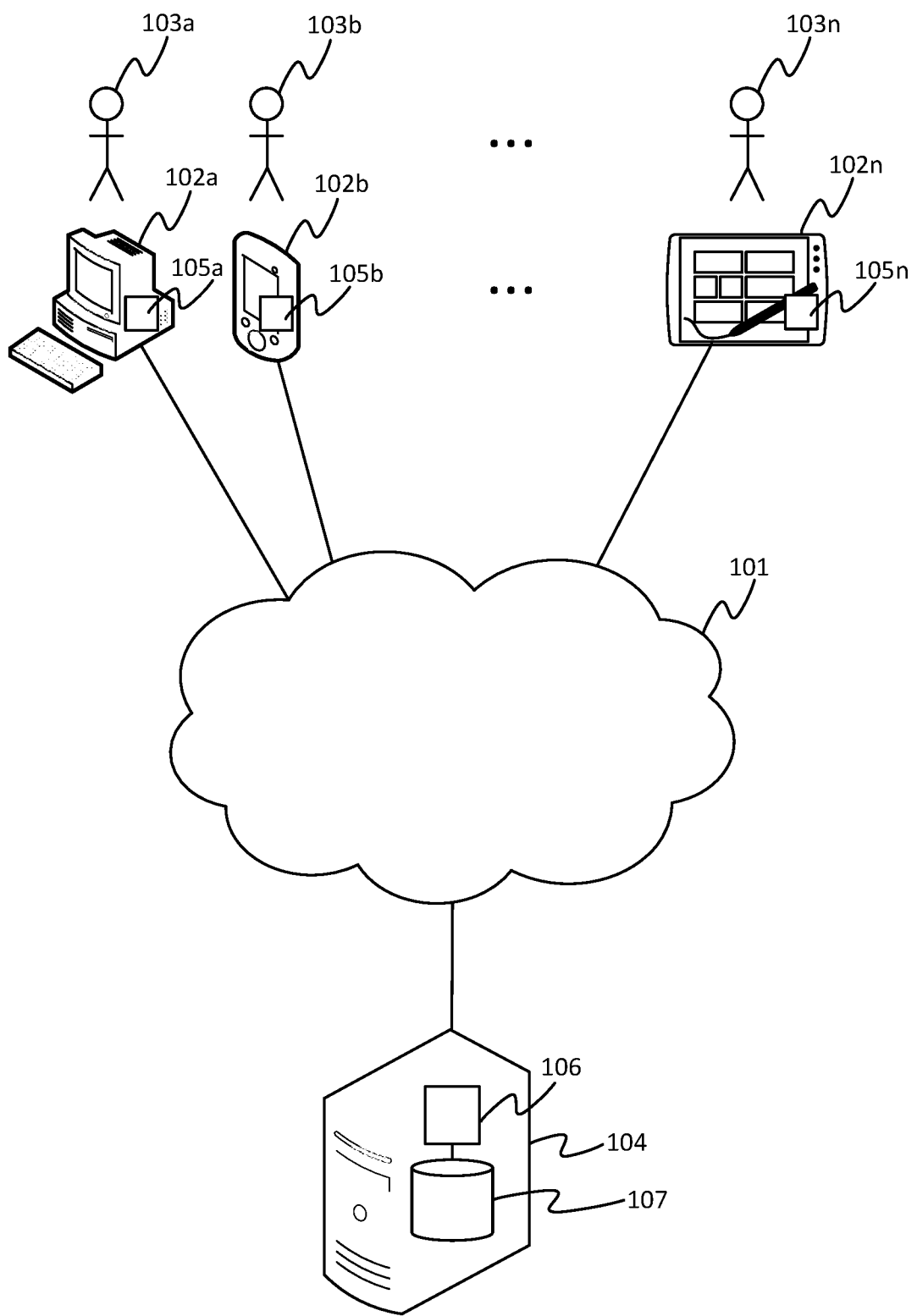
FIG. 1 is a schematic representation of a resource sharing system.

FIG. 1 illustrates a networked computer system over which is implemented a collaborative resource sharing service. The collaborative resource sharing service is based around the sharing of data between users, either for sharing the data as the desired resource per se, or for sharing data that connects users with further physical resources that they wish to dispose of or acquire. For example the service may take the form of a shared economy portal, by which users can post user-composed descriptions of goods or services that they wish to buy, sell, rent or rent-out. Examples below may be described in terms of such a portal, but it will be appreciated that the disclosure is directed to the underlying data filtering technique and not the particular commercial application.

The system comprises a packet-switched data network 101, preferably in the form of a wide-area internetwork such as that commonly referred to as the Internet. The system also comprises a plurality of user terminals 102, each used by a respective user 103. Each user terminal 102 may take any of a variety of potential forms, for instance a static user terminal such as a desktop computer, or a mobile terminal such as a laptop, tablet, smartphone or wearable device (e.g. smartwatch or smart-glasses). Each user terminal 102 is configured to connect to the network 101 via a suitable wired or more often wireless access technology, e.g. via a local wireless router or access point of a wireless local area network (WLAN); or via a mobile cellular network such as a 3GPP network (e.g. 3G, LTE, 4G or 5G network); or via a local wired network such as an Ethernet network; or via a wired modem connecting to the network 101 via a PSTN or cable network. Various other means will be familiar to a person skilled in the art. Note also that the different user terminals need not necessarily take the same form as one another, and need not necessarily connect to the network 101 via the same means.

The system further comprises a server 104, which is also connected to the network 101. Note that a server as referred to herein refers to a logical entity for providing a given service, and may be physically implemented in the form of one or more physical server units located at one or more geographic sites. In the case of multiple units (a so-called "cloud" computing or cloud storage arrangement), suitable techniques for distributed storage and distributed computing will in themselves be familiar to a person skilled in the art. Also, again various suitable wired or wireless means for connecting the server unit(s) to the network 101, and one another in the case of a distributed system, will be known to a person skilled in the art (e.g. those discussed above or others).

By whatever means physically implemented, the server 104 is configured to host a shared economy portal 106 and an associated database 107 storing offers and needs expressed by the users 103 of the shared economy portal 106. The shared economy portal 106 takes the form of software stored on storage of the server 104 and arranged to run on a processing apparatus of the server 104. The shared economy portal 106 is configured so as when run in this manner to provide a shared economy portal service to the users 103 via the network 101, which the users can access from their respective user terminals 102. The shared economy portal 106 is configured to perform server-side functions in accordance with any of the methods disclosed herein.

The storage (memory) on which the shared economy portal 106 is stored may take the form of one or more memory units implemented on one or more memory units implemented in any one or more server units, employing any suitable one or more memory media, e.g. a magnetic medium such as a hard drive, an electronic medium such as an EEPROM, flash memory or solid state drive (SSD), or even an optical medium. Similarly, the storage on which the database 107 is stored may also take the form of one or more memory units implemented on one or more memory units implemented in any one or more server units, employing any suitable one or more memory media such as those mentioned above or others. The processing apparatus of the server 104, upon which the shared economy portal 106 is run, may comprise one or more single cored or multi core processing units implemented in any one or more server units. Such processing units may comprise for example CPUs and/or work-accelerator processors such as GPUs, etc. Various suitable physical processor means will in themselves be familiar to a person skilled in the art.

Each of the user terminals 102 is installed with a respective instance of a client application 105. The client application 105 takes the form of software stored on storage of the respective user terminal 102 and arranged to run on a processing apparatus of the respective user terminal 102. The client 105 is configured so as, when thus run, to access the shared economy portal 106 on the server 104 via the network 101 and any suitable wired or wireless network interface of the respective user terminal 102 (e.g. the network interface being configured to connect via any of the means discussed above). The client 105 is further configured so as, based on this access to the portal 106, to perform client-side functions in accordance with any of the methods describe herein. The client 105 may take the form of a dedicated client designed specifically to operate with the shared economy portal 106, or alternatively it may take the form of a general purposes client application such as a web browser (in which case the shared economy portal 106 comprises a web-front end via which the web browser can access the portal 106).

The storage (memory) on which each respective instance of the client 105 is stored may take the form of one or more memory units of the respective user terminal 102, employing any suitable one or more memory media, e.g. a magnetic medium such as a hard drive, an electronic medium such as an EEPROM, flash memory or solid state drive (SSD), or an optical medium such as a CD ROM or DVD drive. The processing apparatus of the respective user terminal 102, upon which the respective instance of the client 105 is run, may comprise one or more single cored or multi core processing units. Such processing units may again include CPUs and/or work-accelerator processors such as GPUs, etc. Again various suitable physical processor means will in themselves be familiar to a person skilled in the art.

Whatever form the physical implementation takes, the shared economy portal 106 is configured to enable the user 102 of each client instance 105, via that client 105, to submit propositions to be viewed by other users of the portal 106 through their respective client instances 105. A "proposition" as referred to herein is used as an umbrella term to cover either an offer for goods or services made by a user, or a request for goods of services expressed by the user (which may be called a "need", though this does not have to imply an absolute necessity). Either way, each proposition is stored in the database 107 of the server 104, from whence the propositions are made available to be viewed by the various users 102 of the system via their client applications 105. Each description comprises a text description composed by the user 103 him- or herself, e.g. by typing the description on his or her respective user terminal 102, or by speaking it via microphone of the user terminal 102 to a suitable speech recognition algorithm. In embodiments the propositions stored in the database 107 may comprise only offers, only needs, or a mixture of offers and needs.

With a large number of users 103 participating in the system, the number of propositions in the database 107 will become quite large. To this end, the portal 106 comprises a recommendation engine which comprises a filtering function, configured to assist in filtering out the less relevant propositions for a target user, e.g. 103a, and narrowing down to a subset of one or more of the propositions (or parts thereof) having a greater relevance to that user 103a. According to the disclosed techniques, this filtering is based on forming a matrix representation of a set of some or all of the propositions in the database 107, wherein each row represents a different respective proposition made by a given user 102 and each column represents a different lexical components in the user-composed description of the proposition, such as words, word-pairs or phrases in the respective description. The filtering then comprises performing a matrix factorization factorizing by the lexical components, in order to reveal latent clusters of lexical components and/or latent clusters of propositions that had similar descriptions.

A shared economy portal 106 does not have a system of item IDs (e.g. catalogue numbers) classifying different products or services of the same type, category or class (or such like). This means that the recommendation engine cannot simply apply known methods. Instead, the presently disclosed method can be used, which factorizes by words or phrases in order to be able to perform the recommendation. In embodiments, the method also overlays information on the mapping of users to propositions.

An example of the input matrix C is illustrated in FIG. 2, the input matrix C being the input to the matrix factorization.

Each row in the input matrix C represents a different respective one of the propositions (e.g. offers or needs) in the database 107. The input matrix C comprises some or all of the propositions expressed by a multiplicity of different users 102 of the portal 106 (in embodiments this could be >1000 users, >10,000 user, >100,000 users, >1,000,000, >10,000,000 users, or an even greater order of magnitude). The input matrix C may comprise a single proposition from each user, or multiple propositions (multiple rows) from some or all of the users. The propositions included in the input matrix C may comprise all offers, all needs, or a mixture of offers and needs.

Each column in the input matrix C represents a different lexical component that has been used in the description of at least one of the propositions. A lexical component as referred to herein may mean, for example, an individual word, a pair of adjacent words, or a phrase. As another example a lexical component may comprise a lexical affinity, i.e. two words separated by fewer than a threshold number of contiguous words (e.g. the threshold being five). Each individual element of the matrix is a binary value representing whether or not that element was present in the proposition. I.e. if the respective description of the proposition represented by row i contained the lexical component represented by column j, then element (i, j) will be a binary one; but if not it will be zero (or vice versa depending on implementation). It will be appreciated that other similar representations could be used. E.g. in embodiments the elements (i,j) could be soft confidence values, or weights to represent the significance of the component, or count-values to record how many times that component appeared in the description.

It will also be appreciated that which axes are called rows and which are called columns, in terms of orientation of the representation on the page, is a matter of arbitrary definition. One could equivalently flip the orientation of the rows and columns on the page and adapt the notation of the mathematical operations accordingly to produce a mathematically identical result. This would be understood by a skilled person to be equivalent (i.e. identical) to the row and column notation user herein.

Figure 3:
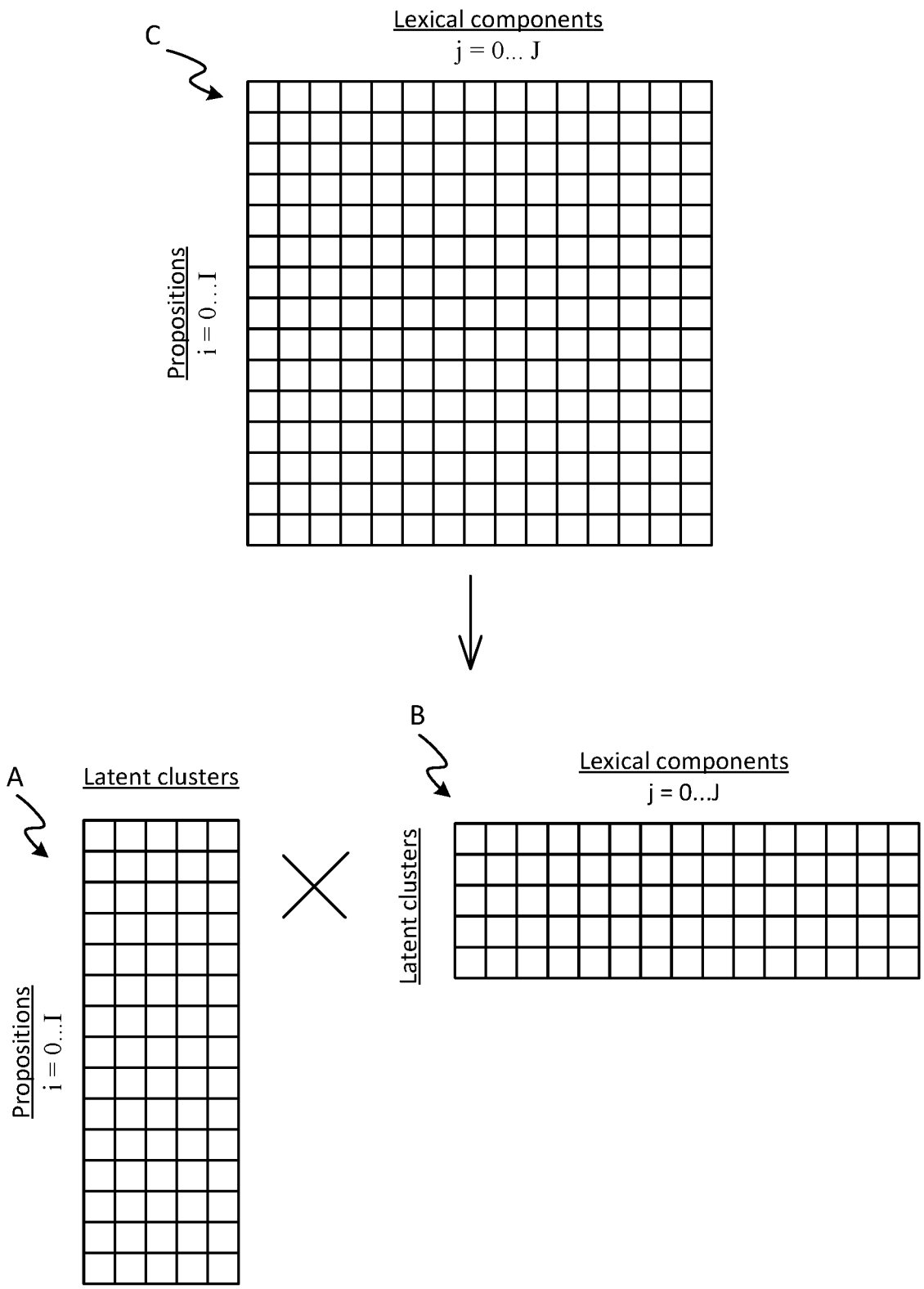

Once an input matrix C is formed, the disclosed techniques then perform a matrix factorization to factorize the input matrix C by lexical components j. This is illustrated in FIG. 3.

A matrix factorization in itself is a known process which, for a general input matrix C, computes two factored-out matrices A and B which if multiplied together according to a matrix multiplication operation would approximately equal the input matrix C. I.e.:

$$A \cdot B \approx C$$

The number of rows in the first factored-out matrix A is equal to the number of rows in the input matrix C (I+1 in the illustrated example), and the number of columns in the second factored-out matrix B is equal to the number of columns in the input matrix C (J+1 in the illustrated example).

In the present case, the first factored-out matrix A represents propositions vs. latent clusters of propositions, and the second factored-out matrix B represents latent clusters of lexical components vs. lexical components. That is, in the first factored-out matrix A, each of the columns (a respective vector) represents a respective cluster of propositions (offers or needs) that were similar to one another in terms of their descriptions. In the second factored-out matrix B, each row (a respective vector) represents a respective cluster of lexical components that tended to be found together in the descriptions.

There are a number of methods by which this can be exploited according to embodiments disclosed herein.

Figure 4:
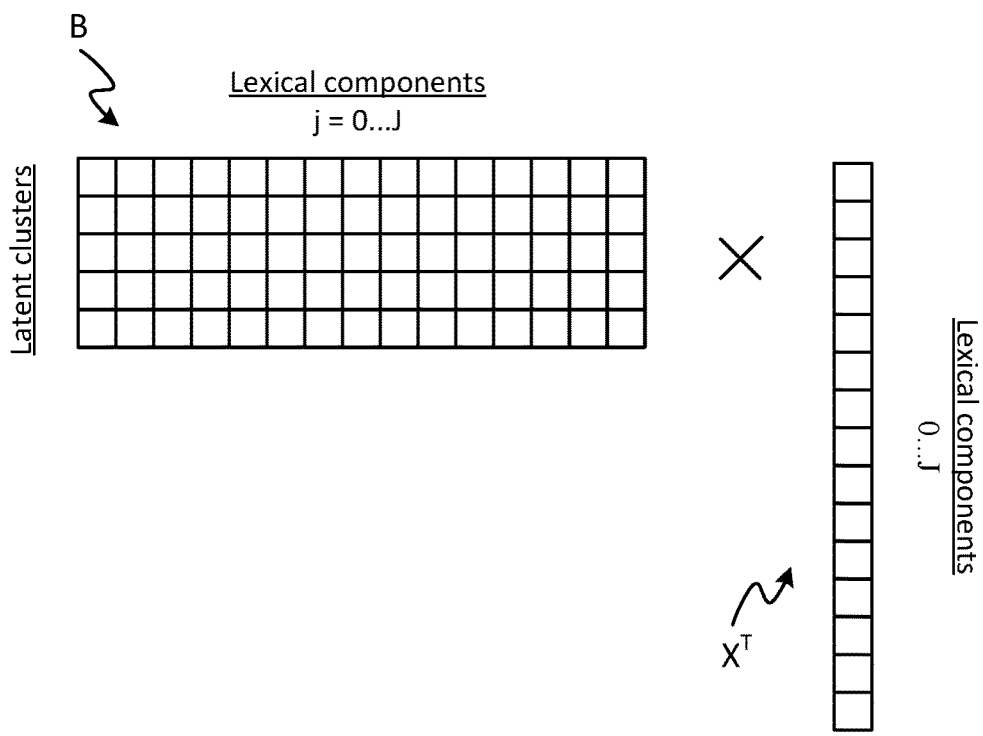
Figure 5:
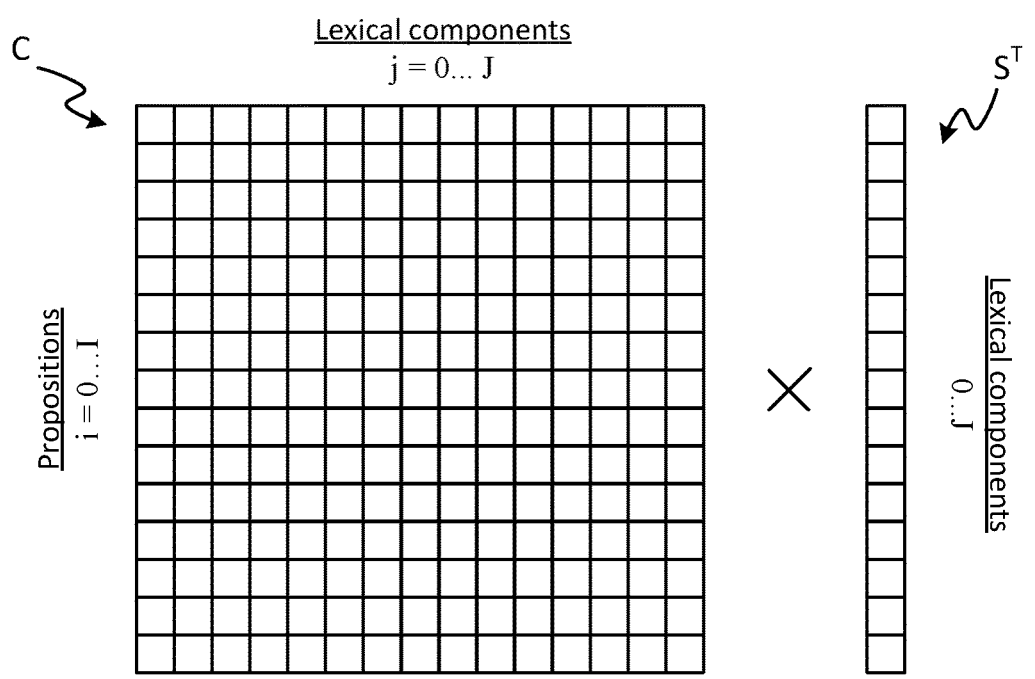

A first method is illustrated by way of example in FIGS. 4 and 5. A target user, e.g. 103a, expresses a target proposition. The target user 103a is a user for whom the results of the filtering are being provided. The target proposition comprises a description of an offer or need expressed by the target user 103a. This could be one of the propositions already in the input matrix C or a new proposition entered by the target user 103a. Either way, the target proposition can be represented as a vector X of lexical components, comprising the same number of elements as there are columns in the second factored-out matrix B.

In a first step of the first method, the filtering function of the portal 106 evaluates a metric measuring the similarity between the target proposition X and each of some or all of the rows of the second factored out matrix B, which represent latent clusters of lexical components. The metric may be any metric for measuring the similarity between two vectors, e.g. the cosine similarity. Put another way, the filtering function measures the "distance" between the target proposition and each latent clusters of lexical components, e.g. the cosine similarity (dot product) or Euclidean distance. For instance, as illustrated in FIG. 4, the filtering function may compute the distances (similarities) by computing:

$$B \cdot X^T$$

Based on the measured distance of the target proposition (offer or need) X relative to each of some or all of the latent clusters in matrix B (each row), the filtering function then compares these values and selects the latent cluster having the closest distance to the target proposition from amongst those compared. E.g. if the selected cluster is labelled S, then the filtering function computes:

$$S = \mathrm{argmax}(B \cdot X^T)$$

i.e. the selected latent cluster S is the row of B at which corresponds to the maximum of the set of values $B \cdot X^T$.

In the second step of the first method, the filtering function finds other propositions (offers/needs) from input matrix C that are close to the selected latent cluster S. That is, it evaluates a metric measuring similarity between the selected cluster S and each of some or all of the other propositions (rows) from the input matrix C, which will include the propositions from a variety of other users 102b-102n of the portal system. Again the evaluated measure of similarity (distance) could be any suitable metric, such as the cosine similarity (dot product) or Euclidean distance. For instance, as illustrated in FIG. 5, the filtering function may compute these distances (similarities) by computing:

$$C \cdot S^T$$

which gives a set of distance values, one for each evaluated proposition from the input matrix C. The filtering function then compares or sorts these in order to identify one or more of the propositions from the input matrix C (one or more of the rows) which have the greatest similarity with the selected latent cluster S. The portal 106 then outputs these as the filter results to the target user 103a, via the client 105 and any suitable user interface of the respective user terminal 103a (e.g. screen or audio interface). Optionally the filtering function also ranks the output results according to the computed distance values, with the most similar proposition being ranked highest.

In the case where the input matrix C comprises a matrix of offers and the target user 103a expresses a target need X, the results output by this method comprise offers from other users 102b-n that closely match the user's need. In the case where the input matrix C comprises a matrix of needs and the target user 103a expresses a target offer X, the output results comprise needs of other users 103b-n that closely match the target user's offer. In the case where the input matrix C comprises a matrix of offers and the target user expresses a target offer X, the output results comprise examples of other similar things that other users 103b-n have offered, which might give the target user 103a ideas about further things he or she might offer him- or herself. In the case where the input matrix C comprises a matrix of needs and the target user 103a expresses a target need X, the output results comprise examples of other similar needs that other users 102b-n have expressed, which might give the target user 103a ideas about further things he or she might need.

A second method according to further embodiments begins in the same manner as the first step of the first method. That is, the target user expresses a target proposition (offer/need) X; and the filter function of the portal 106 measures the distance of this target proposition X to each latent cluster in matrix B in order to find the closest, selects this latent cluster S. Again, in embodiments, this may proceed according to FIG. 4.

In the second step of the second method however, rather than searching for actual instances of propositions from the input matrix C that are similar to the selected latent cluster S as in the first method, instead (or in addition) one or more of the lexical components of the selected latent cluster S are output directly to the target user 103a. Thus the target user 103a is presented with words or phrases from the selected latent cluster S to give the target user ideas for further offers/needs he/she could express or search for through the portal 106. Again the results are output via the client 105 and any suitable user interface of the respective terminal 102a.

Figure 6:
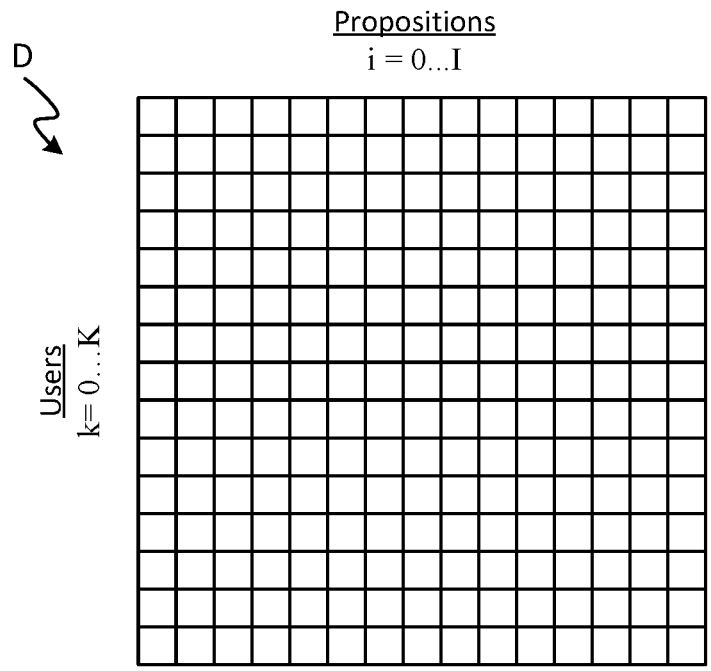
Figure 7:
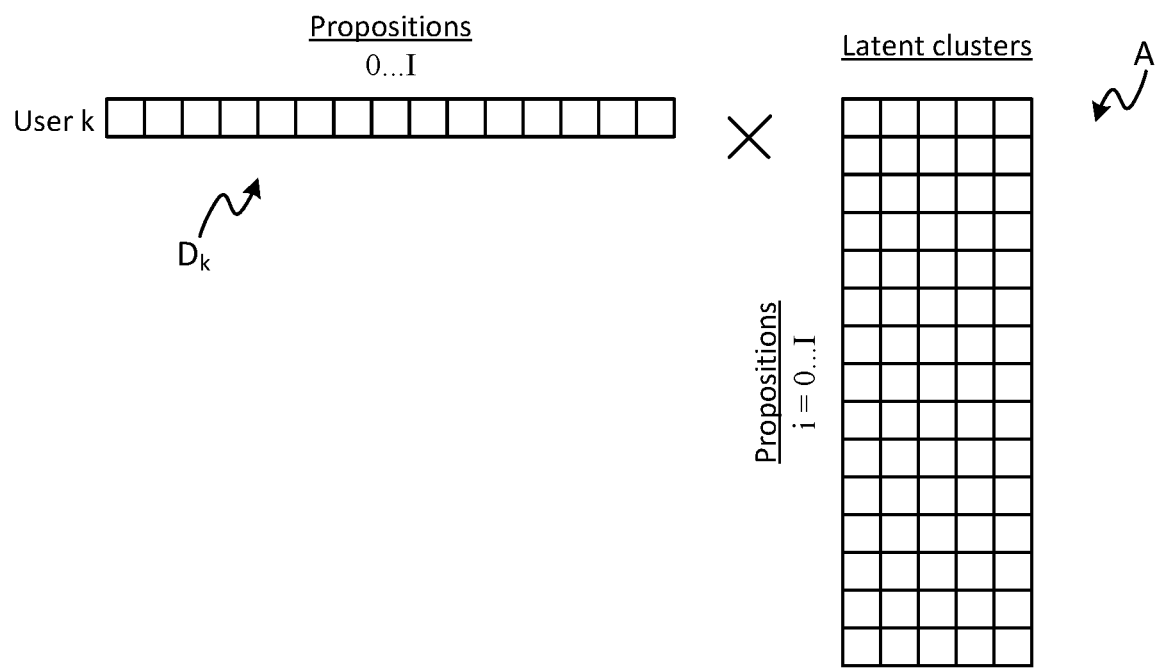

A third method is illustrated by way of example in FIGS. 6 and 7. Here, once the factored-out matrices A and B are obtained, the filtering function can overlay the users (since each proposition is mapped to a user) and see which latent clusters of propositions are likely to be favoured by each user 103, and similarly which items might be suggested to a user, because they are of the same latent factor. Recall that each line in the input matrix C represents a proposition (offer or request). This representation alone does not include the information that the proposition in row i was offered by user k. Instead, in embodiments, this information is maintained in another matrix D so that the filtering function can map users to propositions and based thereon determine which kind of propositions (as mapped via the latent clusters from the first factored-out matrix A) were offered\needed by a given user 103. For example, if after factorizing the item to words matrix we find that the items that a user offered were predominantly in specific latent clusters, the filtering function can determine that this user is interested in offers or needs from these clusters.

FIG. 6 illustrates the user-to-proposition mapping matrix D. Here, each row k represents a different respective one of the users 103 of the portal 106. Each column i represents a different one of the propositions that have been expressed through the portal 106 (corresponding to the rows in the main input matrix C). Each element (k, i) represents whether or not the user of row k was the user that expressed the proposition of column i. Thus a row k from the user-to-proposition matrix D represents a vector $D_k$ of all the offers/needs expressed by a particular target user k, e.g. user 103a.

The third method disclosed herein works by evaluating a metric measuring the similarity between the vector $D_k$ of propositions expressed by the target user 103a and each of some or all of the latent clusters of propositions in the first factored-out matrix A (i.e. columns from matrix A). Again this could be any suitable measure of similarity or "distance", e.g. cosine similarity (dot product) or Euclidean distance. For instances, as illustrated in FIG. 6, the filtering function may compute:

$$D_k \cdot A$$

This represents a set of values, each value giving an indication of likely user interest for the target user 103a in the propositions from a different corresponding one of the latent clusters of propositions (columns from matrix A). The filtering function then compares or sorts the different values, and based thereon selects the one or more of the closest clusters (those found most similar), which represents a cluster or clusters of offers/needs that are most similar to those expressed by the target user 103a. The filtering function then outputs the identified proposition(s) to the target user 103a via the client 105 and user interface of the respective terminal 102a.

Again, these could either be used as offers that match the target user's needs, or needs that match the target user's offers, or examples of other offers that are similar to the target user's offer (to give him/her ideas about other things he/she might offer and could express in new offers), or examples of other needs that are similar to the target user's need (to give him/her ideas about other things he/she might need and could search for or express in new needs).

In embodiments, any of the first, second and third methods may be used individually, or alternatively they may be used in any combination. For example, the first, second and/or third methods may be used together in parallel to provide different kinds of filtered results to the target user 103a.

As another example, the subset of propositions identified by the third method may be used as an initial filtering prior to the second step of the first method. That is, rather than determining the similarity between the selected latent cluster of lexical components S and every one of the propositions (rows) in the input matrix C, which will require a relatively large amount of processing, instead the second step of the first method (e.g. FIG. 5) may only measure the similarity between S and each of the subset of propositions output by the third method.

Some example use cases of the various methods are now discussed. For instance, in a sharing economy model, people can offer products or services for other people to use, or declare their needs so that other people can address them. However, it is sometimes difficult for people to determine which products or services to suggest. Embodiments provide a method of doing so, based on the offers and needs of other people.

This provides an ability to propose to people which other items they might want to offer, and which items they may want to use, in a shared economy portal. For example, the target user 103a may offer some tools for rent on such a portal, but because he/she doesn't think of other such tools that he/she has, then he/she won't offer them. The ability to predict which tools the user has and suggest that he/she offers them, makes the portal service more dense and thus more useful.

The environment may be that of a shared economy system, where some people offer multiple goods for selling or renting, and (possibly other) people buy or rent these items. When a person offers some of the items they have, they may overlook some of the items they have and might offer, had they thought about them. Embodiments facilitate a denser system this by finding items they may have, based on their previous offers. This can be used, for example, when such a user looks for a list of things he may offer (that other people need) the system ranks both items that similar to the ones he offered, and things that he may have.

The portal 106 models all offers and needs in a matrix, such that the rows are offers or needs, and the columns are words, word pairs, lexical affinities, etc. From this matrix, it is possible to create a matrix of the words, etc. that are in all the offers\needs of a person. The filtering function performs a matrix factorization or "clustering" on this matrix. In the case of suggesting additional needs, the output of the matrix factorization of the user-to-offer-words matrix above is used in the following manner. The distance of each need is measured to each of the latent factors or centroids of the matrix factorization. The needs that are close to latent factors that the current user has provided offers for are shown to the user, in the hope that he can fulfil them with items he has not offered. Similarly, the process can be performed for the offers matrix (things the target user 103a didn't realize he/she needed).

The distance itself can be used in the ranking. The ranking can also take into account other factors of the user making the offer (or posting a need) as well as the factors of the users posting needs (and offers) and the interactions between them. These include, for example, the social distance between them, trust among the users, similarity of demographics (same age, same gender), and whether the target user already saw this item in the past. In some embodiments, the filtering unction can comprise a machine learning algorithm to automatically learn, from user interaction, the importance of the distance in determining the ranking relative to other factors can be automatically learned from user interactions. In this case the user gives feedback as to the quality of the results output by the filtering function, either explicitly, or implicitly (e.g. by dismissing irrelevant results). The machine learning algorithm then uses this feedback as training data to gradually learn the relative importance of the distance over multiple trials. The filtering function can this taken into account in future rankings.

In further alternative or additional embodiments, the similarity of the propositions to the target user's latent factor can be done by a weighted sum over the similarities. This weighted approach is similar to the third method described above, except that the filtering function weights the latent clusters by their similarity to the user 103a. If the filtering function finds that several propositions $D_k$ of the target user are not very similar to any of the latent clusters (columns in matrix A), it may still assign a closest cluster, but at a smaller confidence. This can be done by assigning a lower weight based on lower similarity. The confidence may be used to determine whether or not to present the result to the user. And/or, if the ranking takes into account one or more additional factors in addition to the distance, then the confidence or weighting may be used to determine the relative weighting of the distance in the ranking formula relative to the other factor(s) (e.g. social distance).

It will be appreciated that the above embodiments have been descried by way of example only.

More generally, according to one aspect disclosed herein there is provided a computer-implemented filtering method comprising: receiving a set of propositions, each comprising a respective description expressed by a respective user; forming an input matrix of lexical components vs. propositions, wherein rows in the input matrix represents the propositions and columns in the input matrix represent lexical components in the respective descriptions; performing a matrix factorization on the input matrix to reveal latent clusters of the lexical components and/or propositions; filtering said set of propositions based on one or more of said latent clusters; and outputting a result of the filtering to a target user.

In embodiments, said filtering may be performed based on one or more of the latent clusters of lexical components.

In embodiments, the method may comprise receiving a target proposition comprising a description expressed by the target user, the target proposition comprising a vector of lexical components; and said filtering may comprise: evaluating a measure of vector similarity between the target proposition and each of a plurality of the latent clusters of lexical components revealed by said matrix factorization, and selecting a latent cluster from amongst said plurality of latent clusters of lexical components that is most similar to the target proposition according to the evaluated measure.

The matrix factorization may generates a matrix B of lexical components vs. latent clusters of lexical components, and in embodiments the selected latent cluster of lexical components S may be computed according to: S=argmax $(B \cdot X^T)$, where X is the target proposition.

In embodiments, the filtering may comprise: evaluating a measure of vector similarity between the selected latent cluster of lexical components and each of multiple candidate propositions from the input matrix, and selecting a subset comprising one or more of the candidate propositions for which the evaluated measure of vector similarity with the selected latent cluster of lexical components is greatest; wherein said outputting may comprise outputting the subset of propositions to the target user.

In embodiments, said measure of vector similarity between the selected latent cluster S and each of the candidate propositions from the input matrix C may be evaluated by computing: $C \cdot S^T$.

In embodiments, said subset may comprise a plurality of propositions but fewer than the multiple candidate propositions taken from the input matrix, and said outputting may comprise ranking the subset of propositions based on the evaluated measure of vector similarity with the selected latent cluster of lexical components.

In embodiments, the ranking may also be based on one or more other factors evaluated for each of the subset of propositions.

In embodiments, the other factors may comprise, for each of the propositions in said subset, any one or more of: (A) a degree of social relationship between the target user and the respective user who expressed each of the respective proposition, (B) a degree of trust between the target user and the respective user who expressed the respective proposition, (C) a degree of demographic similarity between the target user and the respective user who expressed the respective proposition, and/or (D) whether or not the target user has already viewed the respective proposition.

In embodiments, the method may further comprise receiving feedback from the target user regarding a perceived quality of the filtering; and applying machine learning algorithm based thereon to determine a degree of relevance, relative to the other factors, of said vector similarity between propositions and latent clusters of lexical components.

In embodiments, said outputting may comprise outputting one or more of the lexical components from the selected latent cluster to the target user.

In embodiments, said filtering may be performed based on one or more of the latent clusters of propositions revealed by said matrix factorization.

In embodiments, the method may comprise receiving a target proposition vector comprising a vector of propositions expressed by the target user; said filtering may comprise evaluating a measure of vector similarity between said target proposition vector and each of a plurality of said latent clusters of propositions, and based thereon selecting a most similar latent cluster of propositions; and said outputting may comprise outputting to the target user one or more of the propositions expressed by other users from the selected latent cluster of propositions.

The matrix factorization may generate a matrix A of propositions vs. latent clusters of propositions, and in embodiments said receiving may comprise taking the target proposition vector $D_k$ from a matrix D of users vs. propositions, and said measure of vector similarity between said target vector and each of the plurality of said latent clusters of propositions may be evaluated by computing: $D_k \cdot A$.

In embodiments, the candidate propositions of are taken from the selected clusters of propositions.

In embodiments, any of said measures of vector similarity may comprises cosine similarity or Euclidean distance.

In embodiments, some or all of the lexical components may be words, word-pairs or phrases.

In embodiments, one, some or all of lexical components may be pairs of words within a threshold number of contiguous words of one another.

In embodiments, each of the propositions may represent an offer made by the respective user or a requirement sought by the respective user.

According to another aspect disclosed herein, there is provided a computer program product comprising code embodied on computer-readable storage and configured so as when run on one or more processing units to perform operations in accordance with any of the methods disclosed above.

According to another aspect disclosed herein, there is provided a recommendation system comprising: storage comprising one or more memory units, and processing apparatus comprising one or more processing units; wherein the storage stores code and the processing apparatus is arranged to run said code, the code being configured so as when thus run on the processing apparatus to perform operations in accordance with any of the methods disclosed above.

Other variants may become apparent to a person skilled in the art once given the disclosure herein. The scope of the present disclosure is not limited by the above-described embodiments but only by the accompanying claims.

The invention claimed is:

1. A computer-implemented filtering method comprising:
   receiving a set of propositions, each comprising a respective description expressed by a respective user;
   forming an input matrix of lexical components versus propositions, wherein rows in the input matrix represent the propositions and columns in the input matrix represent lexical components in the respective descriptions;
   performing a matrix factorization on the input matrix to reveal latent clusters of at least one of the lexical components or propositions;
   filtering said set of propositions based on one or more of said latent clusters, wherein said filtering comprises:
      evaluating a measure of vector similarity between a target proposition vector and each of a plurality of said latent clusters of propositions, the target proposition vector comprising a vector of propositions expressed by a target user; and
      selecting a latent cluster of propositions based on said evaluating; and
   outputting a result of the filtering to the target user.

2. The method of claim 1, wherein said filtering is performed based on one or more of the latent clusters of lexical components.

3. The method of claim 2, wherein the method comprises receiving a target proposition comprising a description expressed by the target user, the target proposition comprising a vector of lexical components; and wherein said filtering comprises:
   evaluating a measure of vector similarity between the target proposition and each of a plurality of the latent clusters of lexical components revealed by said matrix factorization, and
   selecting a latent cluster from amongst said plurality of latent clusters of lexical components that is most similar to the target proposition according to the evaluated measure.

4. The method of claim 3, wherein the matrix factorization generates a matrix B of lexical components versus latent clusters of lexical components, and the selected latent cluster of lexical components S is computed according to:

$$S = \mathrm{argmax}(B \cdot X^T),$$

where $X^T$ is the target proposition.

5. The method of claim 3, wherein the filtering comprises:
evaluating a measure of vector similarity between the selected latent cluster of lexical components and each of multiple candidate propositions from the input matrix, and
selecting a subset comprising one or more of the candidate propositions for which the evaluated measure of vector similarity with the selected latent cluster of lexical components is greatest; and
wherein said outputting comprises outputting the subset of propositions to the target user.

6. The method of claim 5, wherein said measure of vector similarity between the selected latent cluster $S^T$ and each of the candidate propositions from the input matrix C is evaluated by computing:

$$C \cdot S^T.$$

7. The method of claim 1, wherein
said selecting comprises selecting a most similar latent cluster of propositions.

8. The method of claim 5, wherein said subset comprises a plurality of propositions but fewer than the multiple candidate propositions taken from the input matrix, and wherein said outputting comprises ranking the subset of propositions based on the evaluated measure of vector similarity with the selected latent cluster of lexical components.

9. The method of claim 8, wherein the ranking is also based on one or more other factors evaluated for each of the subset of propositions.

10. The method of claim 9, wherein the other factors comprise, for each of the propositions in said subset, any one or more of:
a degree of social relationship between the target user and the respective user who expressed each of the respective proposition,
a degree of trust between the target user and the respective user who expressed the respective proposition,
a degree of demographic similarity between the target user and the respective user who expressed the respective proposition, and/or
whether or not the target user has already viewed the respective proposition.

11. The method of claim 9, further comprising receiving feedback from the target user regarding a perceived quality of the filtering; and applying machine learning algorithm based thereon to determine a degree of relevance, relative to the other factors, of said vector similarity between propositions and latent clusters of lexical components.

12. The method of claim 3, wherein said outputting comprises outputting one or more of the lexical components from the selected latent cluster to the target user.

13. The method of claim 3, wherein said measure of vector similarity between the target proposition and each of the plurality of the latent clusters of lexical components comprises cosine similarity.

14. The method of claim 1, wherein said filtering is performed based on one or more of the latent clusters of propositions revealed by said matrix factorization.

15. The method of claim 1, wherein
said outputting comprises outputting to the target user one or more of the propositions expressed by other users from the selected latent cluster of propositions.

16. The method of claim 1, wherein:
the matrix factorization generates a matrix A of propositions versus latent clusters of propositions;
the method comprises taking the target proposition vector $D_k$ from a matrix D of users vs. propositions; and
said measure of vector similarity between said target proposition vector and each of the plurality of said latent clusters of propositions is evaluated by computing:

$$D_k \cdot A.$$

17. The method of claim 1, wherein some or all of the lexical components are words, word-pairs or phrases.

18. The method of claim 1, wherein each of the propositions represents an offer made by the respective user or a requirement sought by the respective user.

19. A computer program product comprising code embodied on computer-readable storage and configured so as when run on one or more processing units to perform operations of:
receiving a set of propositions, each comprising a respective description expressed by a respective user;
forming an input matrix of lexical components versus propositions, wherein rows in the input matrix represent the propositions and columns in the input matrix represent lexical components in the respective descriptions;
performing a matrix factorization on the input matrix to reveal latent clusters of at least one of the lexical components or propositions;
filtering said set of propositions based on one or more of said latent clusters, wherein said filtering comprises:
evaluating a measure of vector similarity between a target proposition vector and each of a plurality of said latent clusters of propositions, the target proposition vector comprising a vector of propositions expressed by a target user; and
selecting a latent cluster of propositions based on said evaluating; and
outputting a result of the filtering to a target user.

20. A recommendation system comprising:
storage comprising one or more memory units, and
processing apparatus comprising one or more processing units;
wherein the storage stores code and the processing apparatus is arranged to run said code, the code being configured so as when thus run on the processing apparatus to perform operations of:
receiving a set of propositions, each comprising a respective description expressed by a respective user;
forming an input matrix of lexical components versus propositions, wherein rows in the input matrix represent the propositions and columns in the input matrix represent lexical components in the respective descriptions;
performing a matrix factorization on the input matrix to reveal latent clusters of at least one of the lexical components or propositions;
filtering said set of propositions based on one or more of said latent clusters, wherein said filtering comprises:
evaluating a measure of vector similarity between a target proposition vector and each of a plurality of said latent clusters of propositions, the target proposition vector comprising a vector of propositions expressed by a target user; and
selecting a latent cluster of propositions based on said evaluating; and
outputting a result of the filtering to a target user.

* * * * *